(12) United States Patent
Hamano et al.

(10) Patent No.: US 7,767,173 B2
(45) Date of Patent: Aug. 3, 2010

(54) APPARATUS FOR FILTERING VOLUME-REDUCED GEL-STATE POLYSTYRENE RESIN

(75) Inventors: Shigenobu Hamano, 1-11, Sukematsu-cho 1-chome, Izumiotsu-shi, Osaka (JP) 595-0071; Noriomi Hayashi, Yatsushiro (JP)

(73) Assignees: Shigenobu Hamano, Osaka (JP); Meishin Kogyo Kabushikigaisha, Kumamoto (JP)

( * ) Notice: Subject to any disclaimer, the term of this patent is extended or adjusted under 35 U.S.C. 154(b) by 900 days.

(21) Appl. No.: 10/552,659

(22) PCT Filed: Apr. 9, 2004

(86) PCT No.: PCT/JP2004/005151
§ 371 (c)(1),
(2), (4) Date: Dec. 15, 2006

(87) PCT Pub. No.: WO2004/092258
PCT Pub. Date: Oct. 28, 2004

(65) Prior Publication Data
US 2007/0119313 A1    May 31, 2007

(30) Foreign Application Priority Data
Apr. 11, 2003   (JP)   ............... 2003-107706

(51) Int. Cl.
*B30B 9/12* (2006.01)
(52) U.S. Cl. .................. 422/270; 422/273; 100/117
(58) Field of Classification Search ............. 422/239, 422/270, 271, 276, 229, 273; 100/119, 117
See application file for complete search history.

(56) References Cited

U.S. PATENT DOCUMENTS 889,159 A * 5/1908 Trump ..................... 422/270

(Continued)

FOREIGN PATENT DOCUMENTS

JP          55-32695 A       3/1980

(Continued)

*Primary Examiner*—Elizabeth L McKane
(74) *Attorney, Agent, or Firm*—Sughrue Mion, PLLC

(57) ABSTRACT

The invention provides a filtration apparatus for volume-reduced gel-state polystyrene resin which can remove foreign matter contained in volume-reduced gel-state polystyrene resin by continuously and effectively filtering the volume-reduced gel-state polystyrene resin.

The filtration apparatus includes a filtration unit 11 in the form of a hollow cylinder having an outer peripheral surface formed of a filter portion 12 for filtering volume-reduced gel-state polystyrene resin; a spiral plate 31 provided on the inner surface of the filtration unit 11, projecting toward the inside of the filtration unit 11 and spiraling in the axial direction of the filtration unit 11; and a holding/driving portion 19 for holding both axial ends of the filtration unit 11 and for rotating the filtration unit 11 about the axis thereof; wherein the filtration unit 11 is disposed so that the axial direction thereof is positioned generally horizontal, and the volume-reduced gel-state polystyrene resin is fed from the first end of the filtration unit 11 to the inside thereof while the filtration unit 11 is rotated by means of the holding/driving portion 19, whereby the volume-reduced gel-state polystyrene resin is continuously separated into volume-reduced gel-state polystyrene resin having passed through the filter portion 12 and foreign matter contained in the volume-reduced gel-state polystyrene resin and transferred to the second end of the filtration unit 11 by means of the spiral plate 31.

15 Claims, 12 Drawing Sheets

U.S. PATENT DOCUMENTS 1,845,893 A * 2/1932 Sommermeyer ............. 554/23
3,585,924 A * 6/1971 Nolan ........................ 100/43
3,802,566 A * 4/1974 Hata ......................... 210/174
5,653,879 A * 8/1997 Schroeder .................. 210/298

FOREIGN PATENT DOCUMENTS

| | | | |
|---|---|---|---|
| JP | 2-1748 | A | 1/1990 |
| JP | 5-59212 | A | 3/1993 |
| JP | 5-33084 | B2 | 5/1993 |
| JP | 5-293827 | A | 11/1993 |
| JP | 7-113089 | A | 5/1995 |
| JP | 9-40802 | A | 2/1997 |
| JP | 9-157435 | A | 6/1997 |
| JP | 2001-164035 | A | 6/2001 |
| JP | 2001-181439 | A | 7/2001 |

* cited by examiner

APPARATUS FOR FILTERING VOLUME-REDUCED GEL-STATE POLYSTYRENE RESIN

TECHNICAL FIELD

The present invention relates to an apparatus for filtering volume-reduced polystyrene resin in a gel state (hereinafter the resin is referred to as volume-reduced gel-state polystyrene resin) to thereby remove foreign matter from the resin (hereinafter the apparatus is referred to as a filtration apparatus for volume-reduced gel-state polystyrene resin). More particularly, the invention relates to a filtration apparatus for volume-reduced gel-state polystyrene resin suitably employed in recovering liquid (solvent) and resin from volume-reduced gel-state polystyrene resin.

BACKGROUND ART

Recently, there have been developed techniques for treating waste resin materials such as polystyrene foam, which have an apparent volume larger than the actual solid (resin component) volume (see, for example, Japanese Patent Application Laid-Open (kokai) Nos. 2-1748, 5-59212, 7-113089, 9-40802, and 9-157435, 2001-181439). According to these techniques, waste resin material is brought into contact with a solvent to form a gel, whereby the volume of the waste resin material is reduced to a volume almost equivalent to the actual volume. Then, the resin is separated from the solvent and reused as a fuel or a resin raw material, while the solvent is reused as a solvent for the volume reduction treatment.

In one procedure proposed in the above, relatively new technical field, resin (solid) and solvent (liquid) are separated from a gel product through evaporation of the solvent to thereby yield a solid, and the vapor is condensed to recover the solvent. Generally, the treatment in which waste resin material is brought into contact with a solvent to form a gel, whereby the volume of the waste resin material is reduced to a volume almost equivalent to the actual volume, is referred to as volume-reduction gelling or simply as volume reduction. The resin that has been gelled to gelatinous solid or gel is called volume-reduced gel-state polystyrene resin.

The aforementioned volume-reduced gel-state polystyrene resin produced from collected waste resin material contains foreign matter such as adhesive tape or labels. Therefore, such foreign matter must be removed from the volume-reduced gel-state polystyrene resin through filtration before carrying out separating/recovering resin and solvent. One disclosed filtration apparatus for volume-reduced gel-state polystyrene resin is an apparatus in which volume-reduced gel-state polystyrene resin is caused to pass through filters (e.g., mesh filters) which are disposed on the top and bottom sides of a high-temperature bath. Another filtration apparatus is an impurity removal apparatus in which volume-reduced gel-state polystyrene resin is fed to a hollow cylindrical filter and filtered through centrifugation by rotating the cylindrical filter (see, for example, Japanese Patent Application Laid-Open (kokai) No. 2001-164035).

When such an impurity removal apparatus is employed, foreign matter contained in the volume-reduced gel-state polystyrene resin can be removed at relatively high efficiency. However, the thus-removed foreign matter is gradually accumulated in the apparatus, requiring frequent maintenance operations. Thus, such an apparatus attains low treatment efficiency with high treatment cost, which is problematic.

DISCLOSURE OF THE INVENTION

In view of the foregoing, an object of the present invention is to provide a filtration apparatus for volume-reduced gel-state polystyrene resin which can remove foreign matter contained in volume-reduced gel-state polystyrene resin by continuously and effectively filtering the volume-reduced gel-state polystyrene resin.

In a first mode of the present invention for attaining the above object, there is provided a filtration apparatus for volume-reduced gel-state polystyrene resin, characterized in that the apparatus comprises a filtration unit in the form of a hollow cylinder having an outer peripheral surface formed of a filter portion for filtering volume-reduced gel-state polystyrene resin;

a spiral plate provided on the inner surface of the filtration unit, projecting toward the inside of the filtration unit and spiraling in the axial direction of the filtration unit; and a holding/driving portion for holding both axial ends of the filtration unit and for rotating the filtration unit about the axis thereof; wherein the filtration unit is disposed so that the axial direction thereof is positioned generally horizontal, and the volume-reduced gel-state polystyrene resin is fed from the first end of the filtration unit to the inside thereof while the filtration unit is rotated by means of the holding/driving portion, whereby the volume-reduced gel-state polystyrene resin is continuously separated into volume-reduced gel-state polystyrene resin having passed through the filter portion and foreign matter contained in the volume-reduced gel-state polystyrene resin and transferred to the second end of the filtration unit by means of the spiral plate.

Through employment of the apparatus of the first mode, volume-reduced gel-state polystyrene resin can be continuously filtered and foreign matter can be automatically discharged to the outside. Thus, the operational efficiency can be enhanced, and cost of operation can be reduced, without performing periodic maintenance operations.

A second mode of the present invention is drawn to a specific embodiment of the filtration apparatus for volume-reduced gel-state polystyrene resin of the first mode, wherein the filter portion has slits provided in the circumferential direction of the filtration unit in the form of a hollow cylinder, each slit being defined by opposing walls.

In the apparatus of the second mode, volume-reduced gel-state polystyrene resin is filtered by passing through the slits of the filter portion under its own weight, and large pieces of foreign matter are reliably removed without passing through the slits.

A third mode of the present invention is drawn to a specific embodiment of the filtration apparatus for volume-reduced gel-state polystyrene resin of the second mode, wherein opposing walls defining each slit have different heights, as viewed in the cross-section of the filtration unit in the axial direction of the unit, whereby an inner surface of the filter portion protruded/dented in the axial direction is provided.

In the apparatus of the third mode, there can be prevented adhesion, onto the inner surface of the filter portion, of foreign matter such as tacky labels contained in the volume-reduced gel-state polystyrene resin.

A fourth mode of the present invention is drawn to a specific embodiment of the filtration apparatus for volume-reduced gel-state polystyrene resin of the second or third mode, wherein the slits are spirally provided.

In the apparatus of the fourth mode, volume-reduced gel-state polystyrene resin is filtered by transferring along the spirally provided slits when the filtration unit is rotated. Thus, filtration efficiency can be enhanced.

A fifth mode of the present invention is drawn to a specific embodiment of the filtration apparatus for volume-reduced gel-state polystyrene resin of any of the first to fourth modes, wherein a protrusion is provided on a portion of the inner surface of the filtration unit in the axial direction of the unit.

In the apparatus of the fifth mode, foreign matter contained in volume-reduced gel-state polystyrene resin is not deposited on the inner surface of the filtration unit, by virtue of the protrusion. Thus, adhesion of foreign matter onto the inner surface of the filtration unit can be prevented.

A sixth mode of the present invention is drawn to a specific embodiment of the filtration apparatus for volume-reduced gel-state polystyrene resin of any of the second to fifth modes, wherein each slit has an inner space and an outer space, the inner space being provided in an inner portion of the filter portion and extending in the radial direction of the filter portion; the outer space being provided in an outer portion of the filter portion and extending in the radial direction of the filter portion; and the inner space and outer space are connected with a connecting portion having a width less than the width of the inner space.

Through employment of the apparatus of the sixth mode, small pieces of foreign matter contained in volume-reduced gel-state polystyrene resin can also be removed.

A seventh mode of the present invention is drawn to a specific-embodiment of the filtration apparatus for volume-reduced gel-state polystyrene resin of the sixth mode, wherein the filter portion is formed of a first filter having a first through-hole, and a second filter having a second through-hole; the first through-hole being provided so as to penetrate the first filter in the thickness direction and serve as the inner space; the second through-hole being provided so as to penetrate the second filter in the thickness direction and serve as the outer space; the first filter and the second filter being provided such that they are disposed with a predetermined distance therebetween in radial direction and that the first through-hole and the second through-hole do not coincide with each other in the axial direction, to thereby form the slits.

In the apparatus of the seventh mode, volume-reduced gel-state polystyrene resin is filtered by passing through the slits of the filter portion under its own weight, and large pieces of foreign matter are reliably removed without passing through the slits. In addition, the filter portion can be readily formed.

An eighth mode of the present invention is drawn to a specific embodiment of the filtration apparatus for volume-reduced gel-state polystyrene resin of the seventh mode, wherein the second filter is formed of a plurality of comb-teeth-shape members disposed in the circumferential direction of the filtration unit; the frontal end of each comb-teeth-shape member with respect to the rotational direction of the filtration unit is secured to the outer peripheral surface of the first filter; the other end serves as a free end; and this other end and the first filter are disposed at predetermined spacing.

In the apparatus of the eighth mode, foreign matter which has passed through the first through-hole is discharged to the outside through a space between the first filter and the comb-teeth-shape members serving as the second filter. Thus, plugging of the filter portion with foreign matter can be prevented.

A ninth mode of the present invention is drawn to a specific embodiment of the filtration apparatus for volume-reduced gel-state polystyrene resin of any of the first to eighth modes, wherein the volume-reduced gel-state polystyrene resin which has been filtered by means of the filter portion provided in the filtration unit is fed to a second filtration apparatus for filtering the volume-reduced gel-state polystyrene resin; the second filtration apparatus includes a microfilter in the form of a hollow cylinder finer than the filter portion provided in the filtration unit; and the volume-reduced gel-state polystyrene resin which has been fed under pressure to the inside the microfilter is extruded to the outside.

Through employment of the apparatus of the ninth mode, small pieces of foreign matter contained in the volume-reduced gel-state polystyrene resin can be almost completely removed.

A tenth mode of the present invention is drawn to a specific embodiment of the filtration apparatus for volume-reduced gel-state polystyrene resin of the ninth mode, wherein the second filtration apparatus comprises the microfilter and a screw member that is fitted in the microfilter, and a tip of the screw member is brought into slidable contact with the inner surface of the microfilter, thereby scraping out foreign matter adhering on the inner surface of the microfilter.

Through employment of the apparatus of the tenth mode, volume-reduced gel-state polystyrene resin is filtered through the microfilter, while foreign matter adhering on the inner surface of the microfilter is scraped out through rotation of the screw member. Thus, volume-reduced gel-state polystyrene resin can be continuously filtered.

An eleventh mode of the present invention is drawn to a specific embodiment of the filtration apparatus for volume-reduced gel-state polystyrene resin of any of the first to tenth modes, further comprising a scraper which is provided so as to abut, at the tip thereof, the outer peripheral surface of the filter portion for scraping out the volume-reduced gel-state polystyrene resin discharged to the outside through filtration by means of the filter portion.

Through employment of the apparatus of the eleventh mode, the volume-reduced gel-state polystyrene resin discharged through the filter portion can be effectively collected, thereby remarkably enhancing operation efficiency.

A twelfth mode of the present invention is drawn to a specific embodiment of the filtration apparatus for volume-reduced gel-state polystyrene resin of any of the first to eleventh modes, which further comprises a feed pipe for feeding volume-reduced gel-state polystyrene resin, the feed pipe extending from the outside of the filtration unit to the inside of the filtration unit.

Through employment of the apparatus of the twelfth mode, volume-reduced gel-state polystyrene resin is reliably fed to the inside of the filtration unit.

A thirteenth mode of the present invention is drawn to a specific embodiment of the filtration apparatus for volume-reduced gel-state polystyrene resin of the twelfth mode, wherein at least a portion of the feed pipe provided inside the filtration unit is formed of a trough having an opening on the upper side thereof.

Through employment of the apparatus of the thirteenth mode, volume-reduced gel-state polystyrene resin spilling over the trough is supplied to a wide area of the filtration unit, thereby enhancing filtration efficiency.

A fourteenth mode of the present invention is drawn to a specific embodiment of the filtration apparatus for volume-reduced gel-state polystyrene resin of any of the first to thirteenth modes, wherein the filtration unit is held by the holding/driving portion in a slanted state such that an end of the filtration unit is located on the upper side.

Through employment of the apparatus of the fourteenth mode, volume-reduced gel-state polystyrene resin can be effectively fed into the filtration unit.

A fifteenth mode of the present invention is drawn to a specific embodiment of the filtration apparatus for volume-reduced gel-state polystyrene resin of any of the first to fourteenth modes, further comprising heating means for heating the filtration unit, which heating means covers the outer peripheral surface of the filtration unit and is not in contact with the filtration unit.

Through employment of the apparatus of the fifteenth mode, a decrease in the fluidity of the volume-reduced gel-state polystyrene resin in the filtration unit can be prevented, thereby remarkably enhancing operation efficiency.

A sixteenth mode of the present invention is drawn to a specific embodiment of the filtration apparatus for volume-reduced gel-state polystyrene resin of the fifteenth mode, wherein the filtration unit is heated by the heating means in which warm water is circulated.

Through employment of the apparatus of the sixteenth mode, the filtration unit can be readily heated to a predetermined temperature.

A seventeenth mode of the present invention is drawn to a specific embodiment of the filtration apparatus for volume-reduced gel-state polystyrene resin of any of the first to sixteenth modes, wherein volume-reduced gel-state polystyrene resin is heated to a predetermined temperature and is caused to pass through an ultrasonic filter to which ultrasonic vibration is applied-so as to fluidize the resin, and the fluidized resin is introduced into the filtration unit.

Through employment of the apparatus of the seventeenth mode, volume-reduced gel-state polystyrene resin is effectively heated so as to be fluidized, thereby remarkably enhancing operation efficiency.

BEST MODES FOR CARRYING OUT THE INVENTION

An embodiment of the present invention will next be described in detail.

Figure 1:
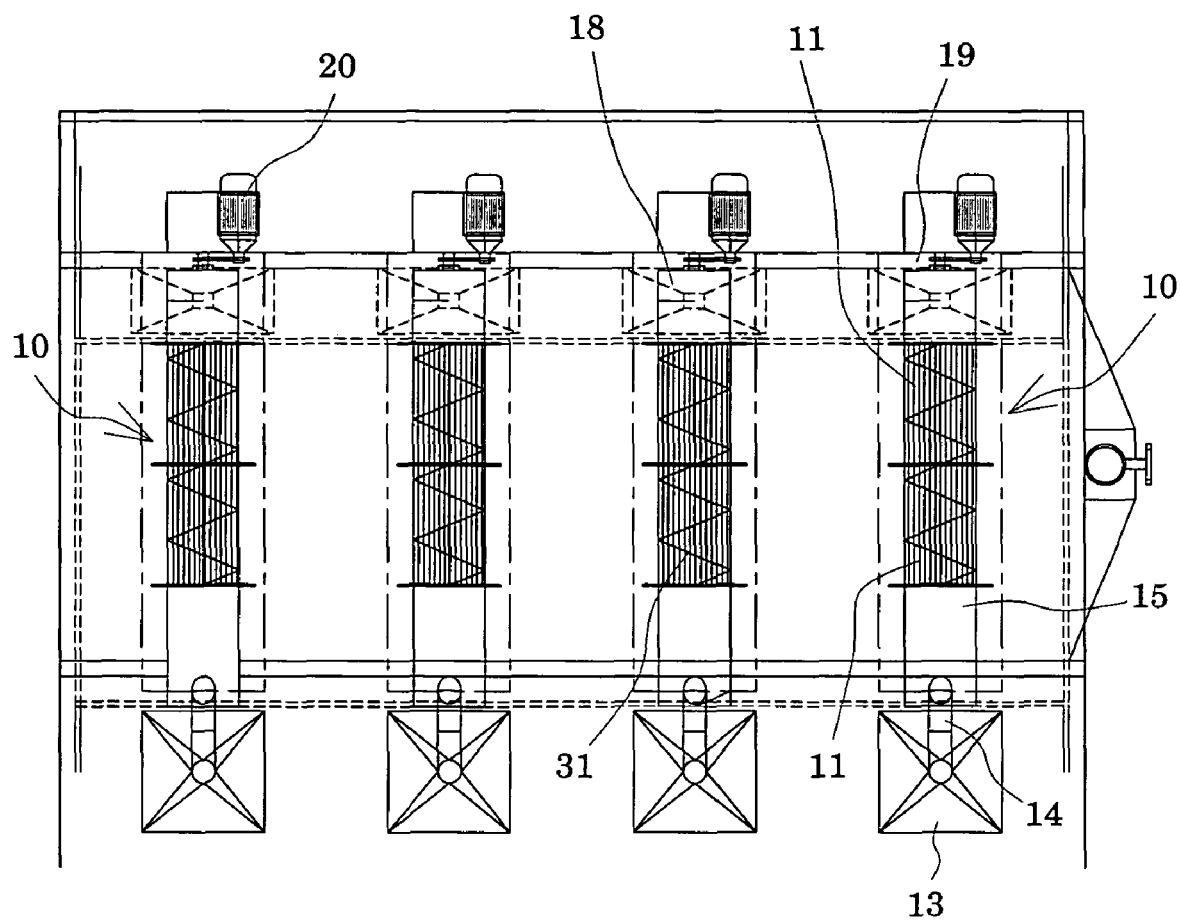
FIG. 1 is a sketch of a filtration apparatus according to one embodiment of the present invention.
Figure 2:
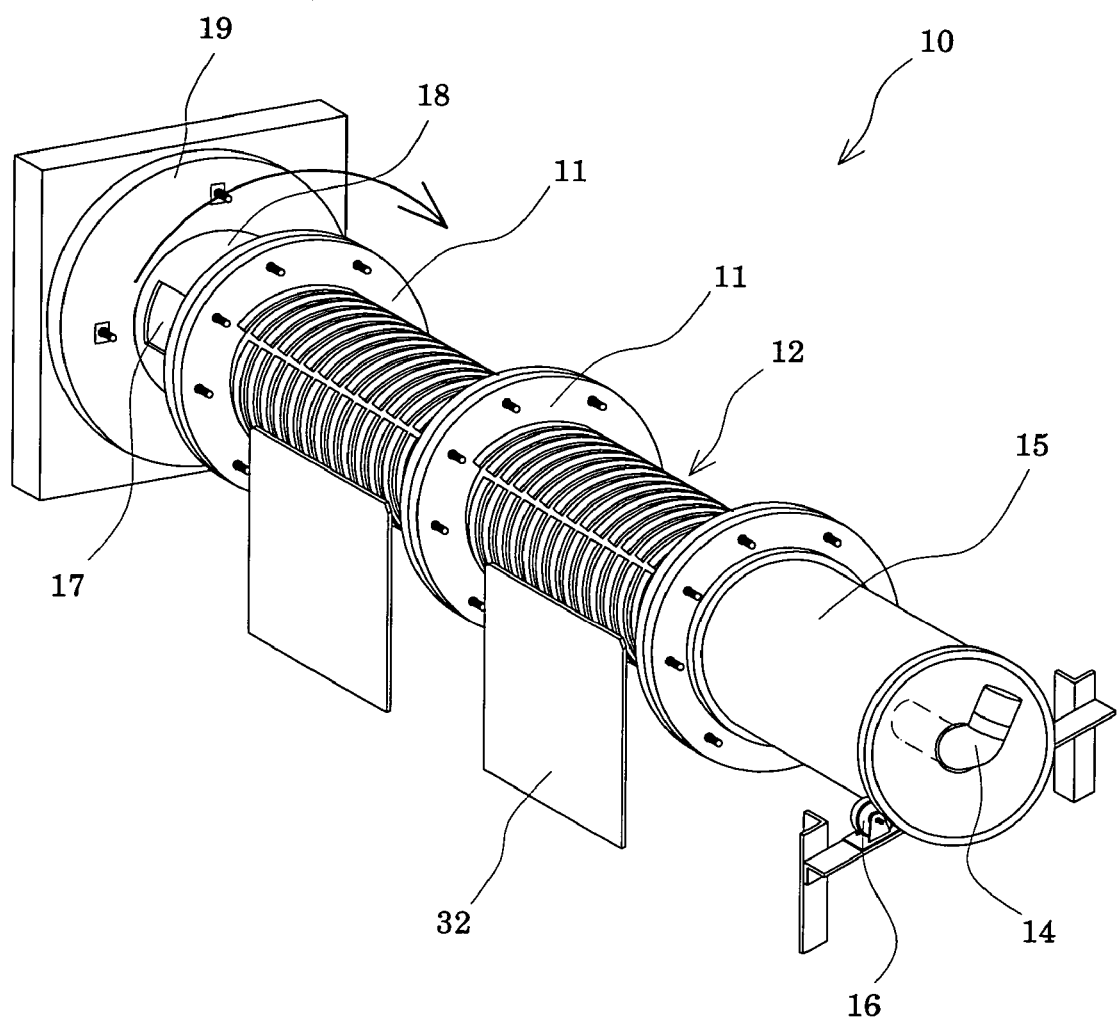
FIG. 2 is a perspective view showing an essential portion of the filtration apparatus according to one embodiment of the present invention.

FIG. 1 is a sketch of the configuration including filtration apparatuses for volume-reduced gel-state polystyrene resin according to one embodiment of the present invention, and FIG. 2 is a perspective view showing an essential portion of one of the filtration apparatuses.

FIGS. 1 and 2 show the filtration apparatus according to the present invention for volume-reduced gel-state polystyrene resin, which apparatus includes a plurality of filtration sections 10 each having filtration units 11 for filtering volume-reduced gel-state polystyrene resin. Each filtration unit 11 is in the form of a hollow cylinder having an outer peripheral surface formed of a filter portion 12 for filtering volume-reduced gel-state polystyrene resin. A plurality of said filtration units 11 are connected to one another (hereinafter the thus-connected filtration units may be collectively referred to as "a filtration unit"), and the center axis of the connected filtration units is disposed so that the axial direction thereof is positioned generally horizontal. A feed member 15 for feeding volume-reduced gel-state polystyrene resin is secured to one axial end of the connected filtration units 11, the feed member 15 being in the form of a hollow cylinder having a cross-sectional diameter generally equal to that of the filtration unit 11. Volume-reduced gel-state polystyrene resin which has been fed to a hopper 13 is transferred via a feed pipe 14 and fed to the filtration units 11 through the feed member 15. The bottom portion of the feed member 15 is supported by a roller member 16, which is a part of holding/driving member. To the other axial end of the connected filtration units 11, a hollow cylindrical discharge member 18 is secured, the discharge member having a discharge opening 17 in a portion of the outer peripheral surface thereof. The discharge member 18 is secured to a holding member 19, which is a part of the holding/driving member. Briefly, the filtration units 11, the feed member 15, and the discharge member 18 are supported rotatably around the axis by the holding member 19 and the roller member 16. To the holding member 19, a driving means 20 such as a motor is connected. Through rotation of the holding member 19 by the driving means 20, the filtration units 11, the feed member 15, and the discharge member 18 are unitarily rotated with the holding member 19.

Figure 3:
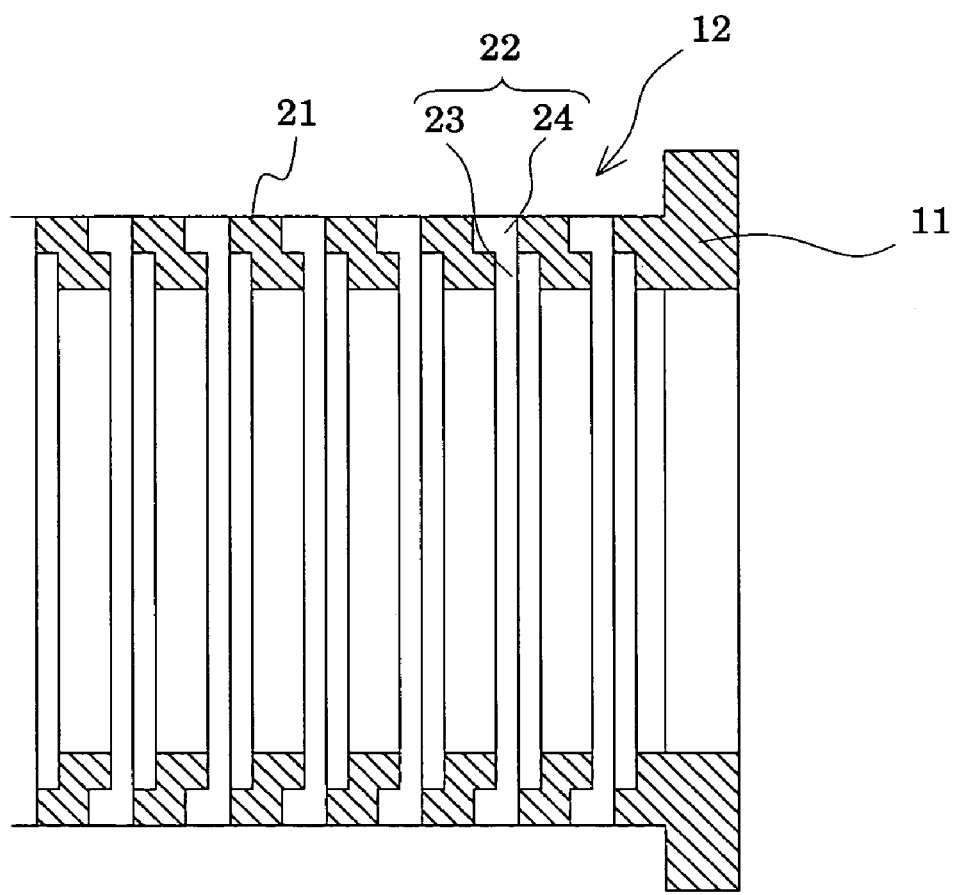
FIG. 3 is a cross-section of a filtration unit according to one embodiment of the present invention.

The filter portion 12 of each filtration unit 11 is provided such that volume-reduced gel-state polystyrene resin is filtered under its own weight. For example, as shown in FIG. 3, the filter portion 12 has slits 22 provided in the circumferential direction of the filtration unit 11, each slit being defined by opposing walls 21. Each slit 22 has an inner space 23 and an outer space 24, the inner space 23 being provided in an inner portion of the filter portion 12 and extending in the radial direction of the filter portion 12, and the outer space 24 being provided in an outer portion of the filter portion 12 and extending in the radial direction of the filter portion 12. The neighboring inner space 23 and outer space 24 are connected with a connecting portion having a width equal to or less than the width of the inner space 23 or outer space 24.

Figure 4:
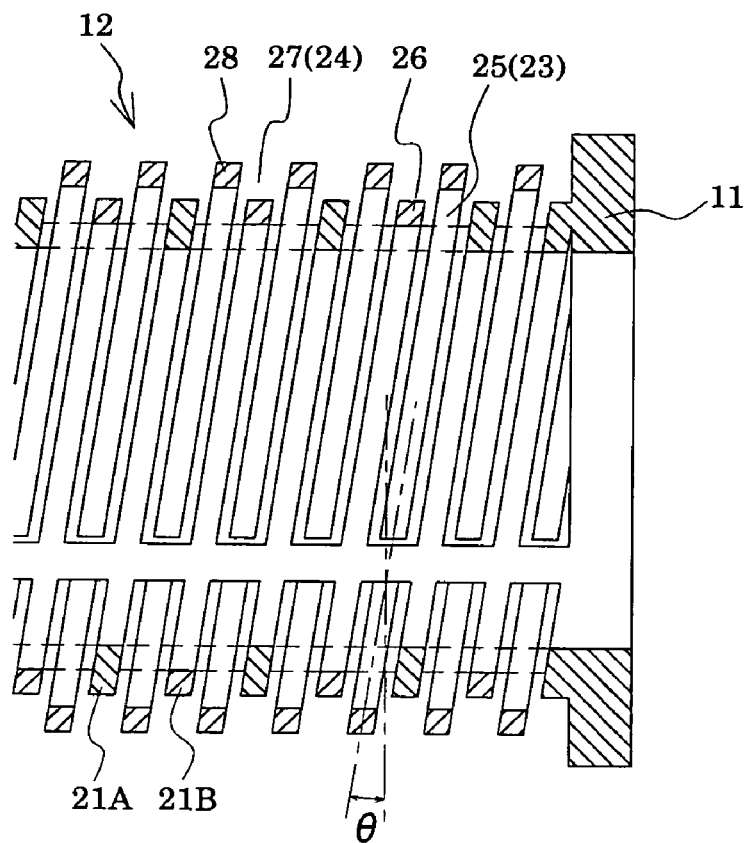
FIG. 4 is a cross-section of a filtration unit according to one embodiment of the present invention.

As shown in FIG. 4, the filter portion 12 of the present embodiment is formed of a first filter 26 having a first through-hole 25, and a second filter 28 having a second through-hole 27. The through-hole 25 is provided so as to penetrate the walls in the thickness direction and serve as the inner space 23, while the through-hole 27 is provided so as to penetrate the walls in the thickness direction and serve as the outer space 24. The first filter 26 and the second filter 28 are provided such that the difference between their diameters has a predetermined value; for example, a value less than the width of the first through-hole 25, and that the first through-hole 25 and the second through-hole 27 do not coincide with each other in the axial direction, whereby the first through-hole 25 and the second through-hole 27 are connected with each other with a connecting portion having a width narrower than that of the first through-hole 25. In the present embodiment, the first filter 26 is provided with the first through-holes 25 (width: about 10 mm) at intervals of about 5 mm, and the second filter 28 is provided with the second through-holes 27 (width: about 11 mm) at intervals of about 4 mm. The first filter 26 and the second filter 28 are provided at an interval of about 3 mm, to thereby form the filter portion 12.

Figure 5:
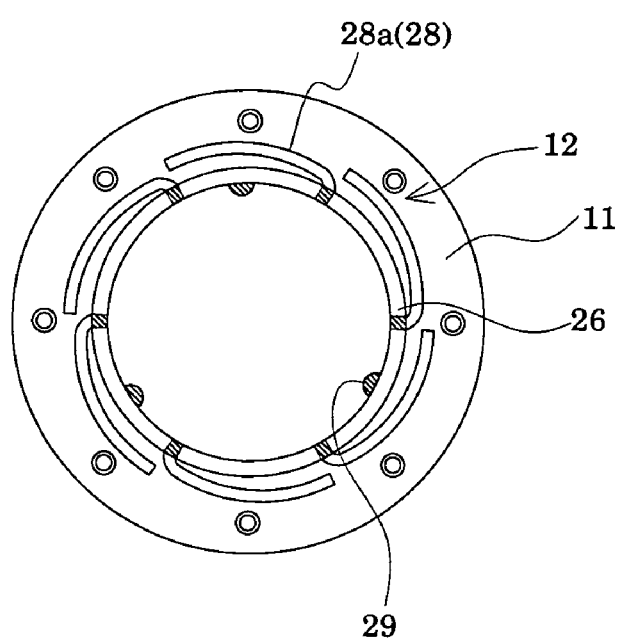
FIG. 5 is a cross-section of a filtration unit according to one embodiment of the present invention.

Preferably, the aforementioned slits 22 are provided spirally in the axial direction of the filter portion 12. In the present embodiment, the first through-hole 25 and the second through-hole 27, which form each slit 22, are spirally provided, while being slanted at about 9° with respect to the circumferential direction of the filter portion 12. The inner surface of the first filter 26 is a protruded/dented surface having protrusions and dents as viewed in the axial direction of the filtration unit 11. In other words, walls 21A and 21B defining the first through-hole 25 have different heights, as viewed in the cross-section in the axial direction as shown in FIG. 4, whereby a protruded/dented inner surface of the first filter 26 is provided. As shown in FIG. 5, a plurality of protrusions 29 is provided on the inner surface of the filtration unit 11 in the axial direction of the unit.

In the present embodiment, the second filter 28 provided on the outer peripheral surface of the first filter 26 is formed of a plurality of comb-teeth-shape members 28a as shown in FIG. 5. The frontal end of each comb-teeth-shape member 28a with respect to the rotational direction of the filtration unit 11 is secured to the outer peripheral surface of the first filter 26, and the other end serves as a free end. Similar to other portions, the free ends of the comb-teeth-shape members 28a and the first filters 26 are disposed at a predetermined interval.

Figure 6:
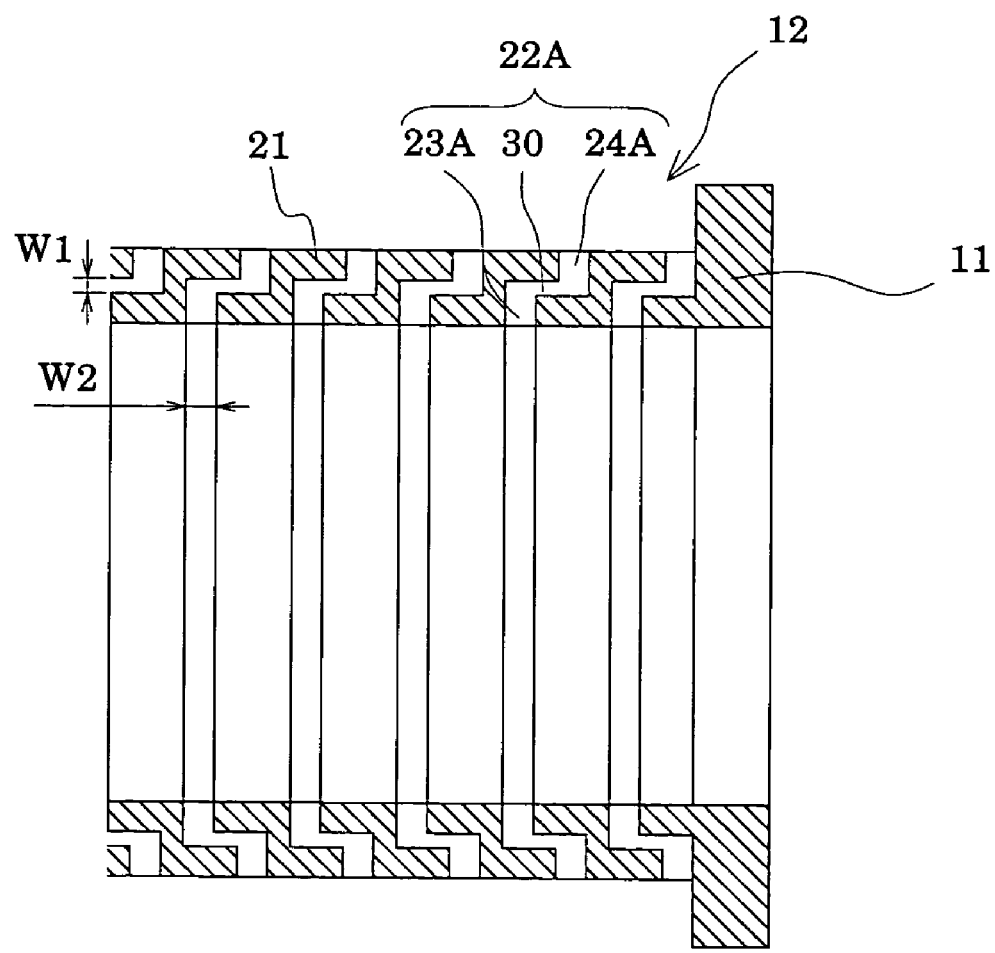
FIG. 6 is a cross-section of another filtration unit according to one embodiment of the present invention.

The structure of the filter portion 12 is not limited to the aforementioned structure. For example, as shown in FIG. 6, a slit 22A may be formed of an inner space 23A provided in an inner portion of the filter portion 12 and extending in the radial direction of the filter portion 12; an outer space 24A provided in an outer portion of the filter portion 12 and extending in the radial direction of the filter portion 12; and a connecting space 30 which is connected to the spaces 23A and 24A and extends in the direction crossing the spaces 23A and 24A. When this structure is employed, the connecting space 30 is preferably provided in a direction approximately normal to the depth direction of the inner space 23A and the outer space 24A. The width W1 of the connecting space 30 is preferably narrower than the width W2 of the inner space 23A.

Figure 7:
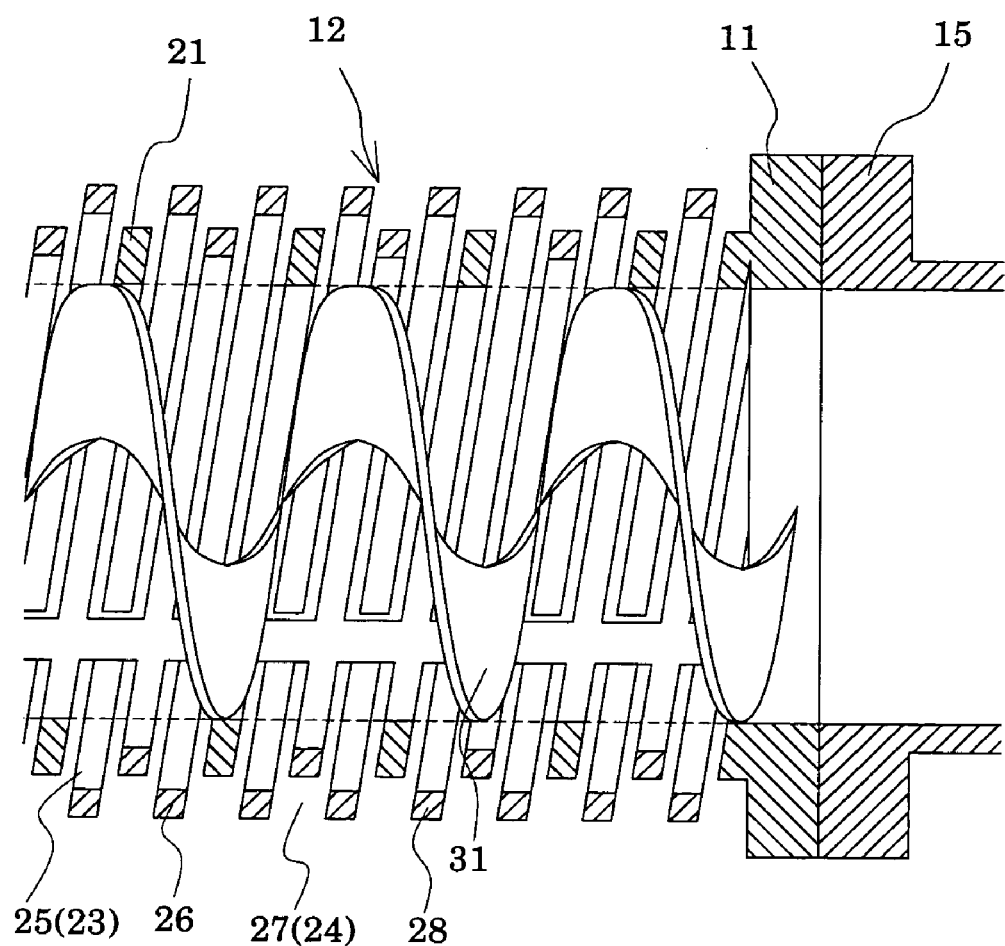
FIG. 7 is a schematic view showing a spiral plate according to one embodiment of the present invention.

As shown in FIG. 7, a spiral plate 31 is provided on the inner surface of the filtration unit 11 having slits and that of the feed member 15, projecting toward the inside of the filtration unit and the feed member and spiraling in the axial direction of the filtration unit 11 and the feed member 15. The spiral plate 31 is provided continuously from the feed member 15 to the discharge member 18 in the rotational direction of the filtration unit 11. Through rotation of the filtration unit 11, volume-reduced gel-state polystyrene resin which has been introduced to the filtration unit 11 is transferred from the feed member 15 to the discharge member 18 by means of the spiral plate 31. In the present embodiment, the spiral plate 31 is provided only in the filtration unit 11. However, the mode of provision of the spiral plate is not limited thereto. For example, the spiral plate 31 may be provided continuously from the feed member 15 to the filtration unit 11.

Although the details will be described below, volume-reduced gel-state polystyrene resin can be filtered under its own weight through filtration by means of the aforementioned filtration unit 11. In addition, large pieces of foreign matter contained in volume-reduced gel-state polystyrene resin can be reliably removed.

A plate-form scraper 32 is caused to abut, at the tip thereof, the outer peripheral surface of the filter portion 12 of the filtration unit 11, in the axial direction of the filtration unit 11. The scraper 32 is provided so as to scrape out the volume-reduced gel-state polystyrene resin discharged to the outside through filtration by means of the filter portion 12.

Figure 8:
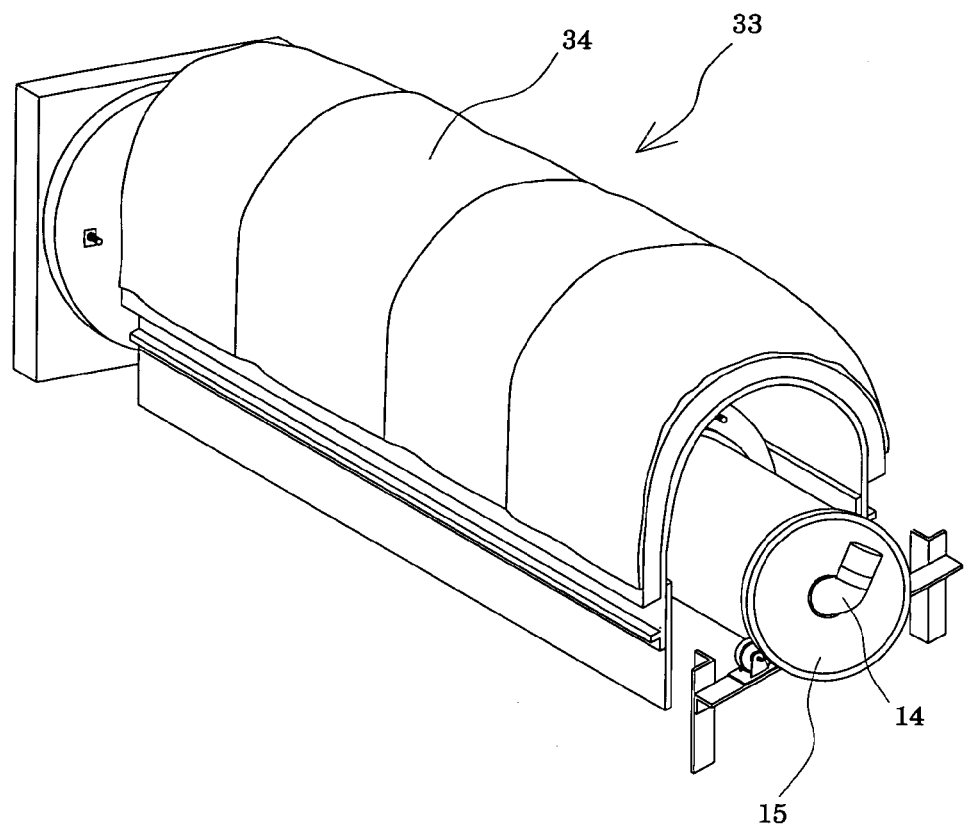
FIG. 8 is a perspective view showing heating means according to one embodiment of the present invention.

As shown in FIG. 8, the outer peripheral surface of the filtration unit 11 may be covered with a heating apparatus 33 for heating the filtration unit 11 at a predetermined temperature such that the heating apparatus is not in contact with the filtration unit 11. No particular limitation is imposed on the type of the heating apparatus 33, so long as the apparatus can heat the filtration unit 11 to a predetermined temperature; i.e., heat the volume-reduced gel-state polystyrene resin contained in the filtration unit 11 to a predetermined temperature. For example, the present embodiment employs a heating apparatus 33 formed of a hollow heating member 34 in which warm water is circulated to heat the filtration unit 11. Through employment of the heating apparatus, a decrease in the fluidity of the volume-reduced gel-state polystyrene resin during filtration thereof by means of the filtration unit 11 can be prevented, thereby remarkably enhancing operation efficiency.

The filtration apparatus for volume-reduced gel-state polystyrene resin having the aforementioned structure may be employed before a step of separating/recovering volume-reduced gel-state polystyrene resin. Hereinafter, a filtration procedure employing such a filtration apparatus will be described.

The volume-reduced gel-state polystyrene resin is collected, for example, in a collection container such as a drum can. As used herein, the term "volume-reduced gel-state polystyrene resin" refers to a gel-state product obtained through bringing into contact with a solvent a waste of polystyrene resin, polystyrene foam, etc. having an apparent volume larger than the true resin volume. No particular limitation is imposed on the type of solvent treatment of volume-reduced gel-state polystyrene resin. In the present embodiment, a waste of polystyrene resin or polystyrene foam is treated with a solvent having a flash point of about 40° C. to 100° C. and an ignition point of about 180° C. to 350° C. No particular limitation is imposed on the original use of volume-reduced wastes of polystyrene resin and polystyrene foam. In other words, waste resin materials such as wastes of civil engineering and building materials and food trays may be used without any limitations. No particular limitation is imposed on the amount of resin waste treated with a solvent of a given volume. In other words, a resin liquid having relatively high fluidity and an almost solidified resin having a concentration approximately equivalent to a threshold on the treatment limit may be filtered.

The filtration apparatus of the present invention is employed for filtration of the aforementioned volume-reduced gel-state polystyrene resin. Before filtration of volume-reduced gel-state polystyrene resin in the filtration sections 10, fluidity of the volume-reduced gel-state polystyrene resin that has been collected is enhanced in advance. Briefly, fluidity of the volume-reduced gel-state polystyrene resin that has collected in a collection container is enhanced while the resin is present in the container. For example, in the present embodiment, a collection container containing volume-reduced gel-state polystyrene resin is sealed and maintained in warm water at about 30 to 100° C., preferably about 30 to 80° C., for a predetermined time, to thereby enhance fluidity of the volume-reduced gel-state polystyrene resin.

The temperature to which volume-reduced gel-state polystyrene resin is heated is lower than the flash point of the solvent used, preferably a temperature lower than the flash point by 5° C. or more. For example, the solvent used for volume reduction of resin has a flash point of about 40 to 100° C. and an ignition point of about 180 to 350° C. Thus, in the present embodiment, the collection container containing volume-reduced gel-state polystyrene resin is maintained in warm water at about 30 to 100° C. for 1 to 2 hours. Through this heat treatment, fluidity of the volume-reduced gel-state polystyrene resin contained in the container is remarkably-enhanced.

Figure 9:
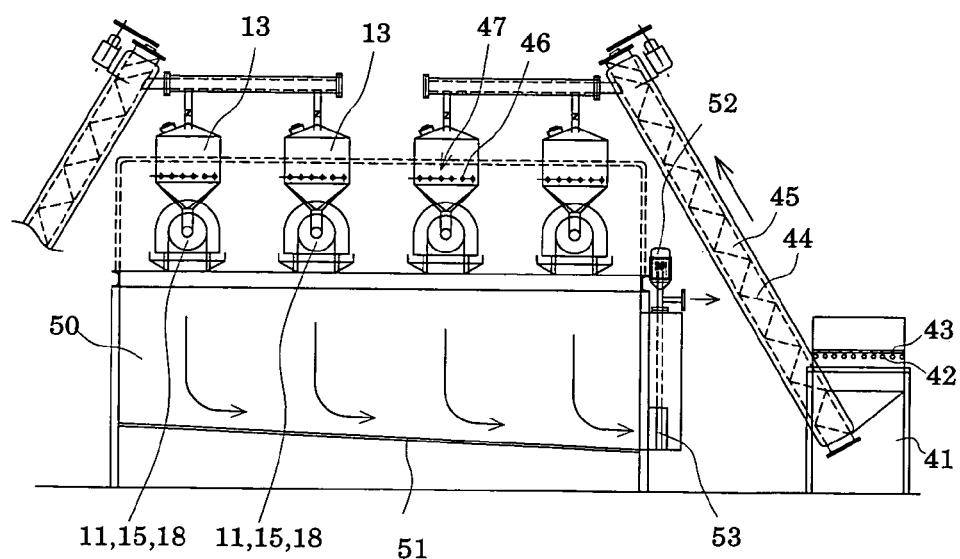
FIG. 9 is a schematic view showing the general configuration including filtration apparatuses according to one embodiment of the present invention.
Figure 10:
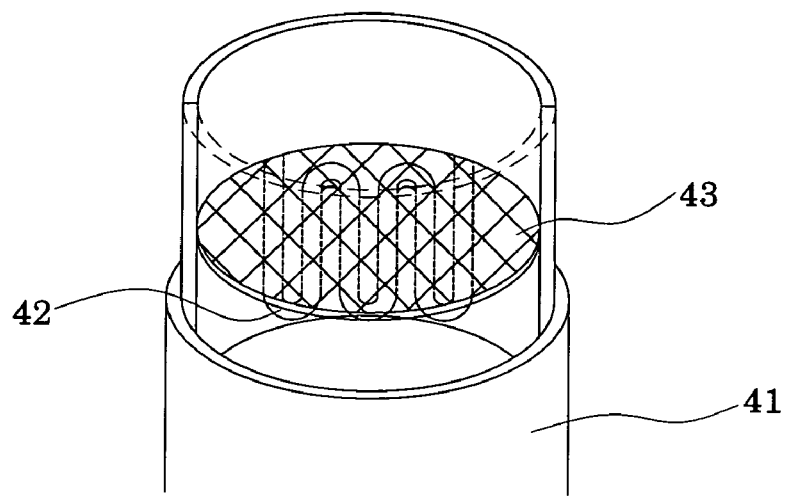
FIG. 10 is a schematic view showing a deposit tank according to one embodiment of the present invention.

Subsequently, the volume-reduced gel-state polystyrene resin whose fluidity has been enhanced in the collection container is fed to a deposition tank 41 shown in FIG. 9. As shown in FIG. 10, in the present embodiment, a heating means such as a heating medium flow pipe 42 in which warm water at a predetermined temperature is circulated is provided at the inlet of the deposition tank 41, and a filter such as a filter 43 having relatively coarse mesh (e.g., about 5 to 20 mesh) is provided on the heating medium flow pipe 42. Through provision of the heating means and the filter, large pieces of foreign matter contained in the collected volume-reduced gel-state polystyrene resin are removed by means of the filter 43 during feeding of the volume-reduced gel-state polystyrene resin into the deposition tank 41, and fluidity of the resin is further enhanced by heating the resin through contact with the heating medium flow pipe 42.

During feeding of volume-reduced gel-state polystyrene resin to the deposition tank 41, ultrasonic vibration may be applied to the filter 43. Through ultrasonic vibration, volume-reduced gel-state polystyrene resin smoothly passes through the filter 43, thereby remarkably enhancing treatment efficiency. When ultrasonic vibration is applied to the filter 43 under appropriate conditions, a requirement for enhancing fluidity of volume-reduced gel-state polystyrene resin before filtration may be mitigated through application of the ultrasonic vibration to the filter 43.

The thus-fluidity-enhanced volume-reduced gel-state polystyrene resin is transferred, through a transfer means 44 such as a screw pump, to the hopper 13 provided in each filtration section 10. Preferably, the peripheral outer surface of a transfer pipe 45 in which the volume-reduced gel-state polystyrene resin is transferred through the transfer means 44 is, for example, covered with a thermal insulator or heated, whereby a decrease in fluidity of the volume-reduced gel-state polystyrene resin during transfer thereof caused by lowering in temperature is prevented.

The volume-reduced gel-state polystyrene resin that has been fed to the hopper 13 is fed, via the feed pipe 14, to the feed member 15 rotating about the axis. In the present embodiment, similar to the aforementioned deposition tank 41, the bottom portion of the hopper 13 is provided with a heat medium flow pipe 46 serving as a heating means. The volume-reduced gel-state polystyrene resin that has been fed to the hopper 13 is brought into contact with the heat medium flow pipe 46, to thereby further enhance fluidity. The thus-fluidity-enhanced resin is fed into the feed member 15.

The volume-reduced gel-state polystyrene resin that has been fed into the feed member 15 is sequentially transferred to the filtration unit 11 by means of the spiral plate 31 provided inside the feed member. In this case, the filtration unit 11 is rotated at, for example, 1 rpm or less. The volume-reduced gel-state polystyrene resin that has been fed into the filtration unit 11 is transferred to the discharge member 18 by means of the spiral plate 31 rotating with the filtration unit 11. During transfer, the resin is discharged to the outside through the filter portion 12 under its own weight. In other words, the volume-reduced gel-state polystyrene resin is gradually filtered through the filter portion 12, concomitant with reducing the volume thereof, and transferred to the discharge member 18 by means of the spiral plate 31. In the present embodiment, since the slits 22 are spirally formed in the filtration unit 11, volume-reduced gel-state polystyrene resin can be readily transferred to the discharge member 18 along the slits 22.

The connected filtration units 11, feed member 15, and discharge member 18 may be slightly slanted such that the feed member 15 is located on the upper side. Through this configuration, volume-reduced gel-state polystyrene resin can be more readily transferred from the feed member 15 toward the discharge member 18.

As mentioned above, the filter portion 12 is formed of a plurality of slits 22. These slits 22 are formed of the first through-hole 25 provided in the first filter 26 and the second through-hole 27 provided in the second filter 28 (see FIG. 4). Thus, volume-reduced gel-state polystyrene resin is continuously filtered through the slits 22 under its own weight, and foreign matter contained in the volume-reduced gel-state polystyrene resin remains in the filtration unit 11 without passing through the slits 22.

In this case, when relatively thin foreign matter such as tacky labels is contained in volume-reduced gel-state polystyrene resin, such foreign matter adheres onto the inner surface of the first filter 26, possibly causing plugging of the first through-hole 25. However, in the present embodiment, since the first filter 26 has a protruded/dented inner surface, adhesion of foreign matter can be effectively prevented. In addition, in the present embodiment, the protrusions 29 are provided on the inner surface of the first filter 26. Therefore, foreign matter moving on the inner surface of the first filter 26 is not deposited on the inner surface, by virtue of the protrusions 29. Thus, adhesion of foreign matter onto the inner surface of the first filter 26 and plugging of the slits 22 by foreign matter can be more reliably prevented.

When volume-reduced gel-state polystyrene resin is continuously filtered by means of such a filtration unit 11, the volume-reduced gel-state polystyrene resin is completely discharged through the filter portion 12 during transfer to the area of the filtration unit 11 in the vicinity of the discharge member 18, and only foreign matter contained in the volume-reduced gel-state polystyrene resin remains in the filtration unit 11. The foreign matter remaining in the filtration unit 11 is transferred to the discharge opening 17 provided in the discharge member 18 by means of the spiral plate 31, where the foreign matter is separately discharged to the outside.

Figure 11:
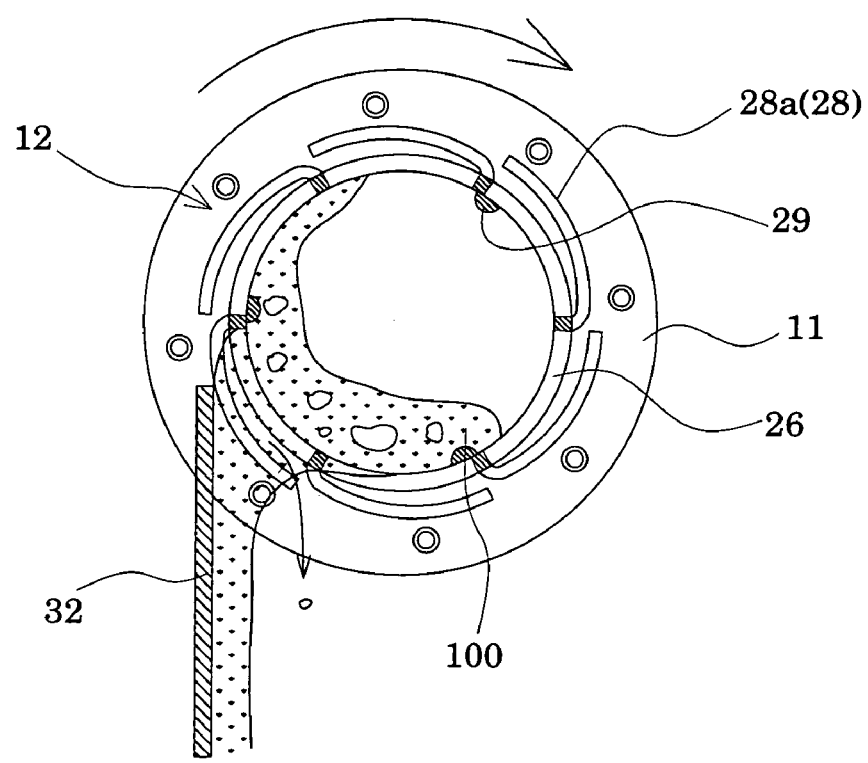
FIG. 11 is a sketch showing a filtration operation performed by means of a filtration apparatus according to one embodiment of the present invention.

The volume-reduced gel-state polystyrene resin which has been discharged through the filter portion 12 to the outside falls under its own weight to a gel deposition tank 50. As shown in FIG. 11, the tip of the scraper 32 is caused to abut the outer peripheral surface of the filtration unit 11; i.e., the outer surface of the filter portion 12. Thus, when volume-reduced gel-state polystyrene resin 100 has a relatively high viscosity, the discharged resin 100 can be effectively scraped out by the scraper 32 and collected.

In the present embodiment, the scraper 32 is disposed tangentially in relation to the filtration unit 11. When the filtration unit 11 is rotated, the surface of the filter portion 12 is brought into contact with the scraper 32, with the filtration unit 11 sliding from the base to the tip of the scraper. Needless to say, the direction of sliding of the filtration unit 11 with respect to the scraper 32 which is in contact with the filtration unit is not limited to the above-described direction. For example, the surface of the filter portion 12 may be brought into contact with the scraper 32, with the filter portion 12 sliding from the tip to the base of the scraper. In addition, no particular limitation is imposed on the position of the scraper 32, and the scraper 32 may be positioned radially in relation to the filtration unit 12.

During filtration of the volume-reduced gel-state polystyrene resin 100 through the filter portion 12, small pieces of foreign matter are discharged to the outside with the volume-reduced gel-state polystyrene resin 100 through the slits 22. In this case, the foreign matter may plug the slits 22. However, the second filter 28 of the present embodiment is formed of a plurality of the comb-teeth-shape members 28a. Therefore, even when large pieces of foreign matter have passed through the first through-hole 25, the foreign matter is discharged to the outside through the free ends of the comb-teeth-shape members 28a.

Through employment of the filtration apparatus of the present invention, the volume-reduced gel-state polystyrene resin which has been filtered and foreign matter contained in the volume-reduced gel-state polystyrene resin are continuously and separately discharged to the outside. Thus, maintenance operations such as removal of foreign matter accumulated in the filtration unit 11 can be eliminated, leading to remarkable enhancement of operation efficiency and reduction of cost such as personnel expenses.

Figure 12:
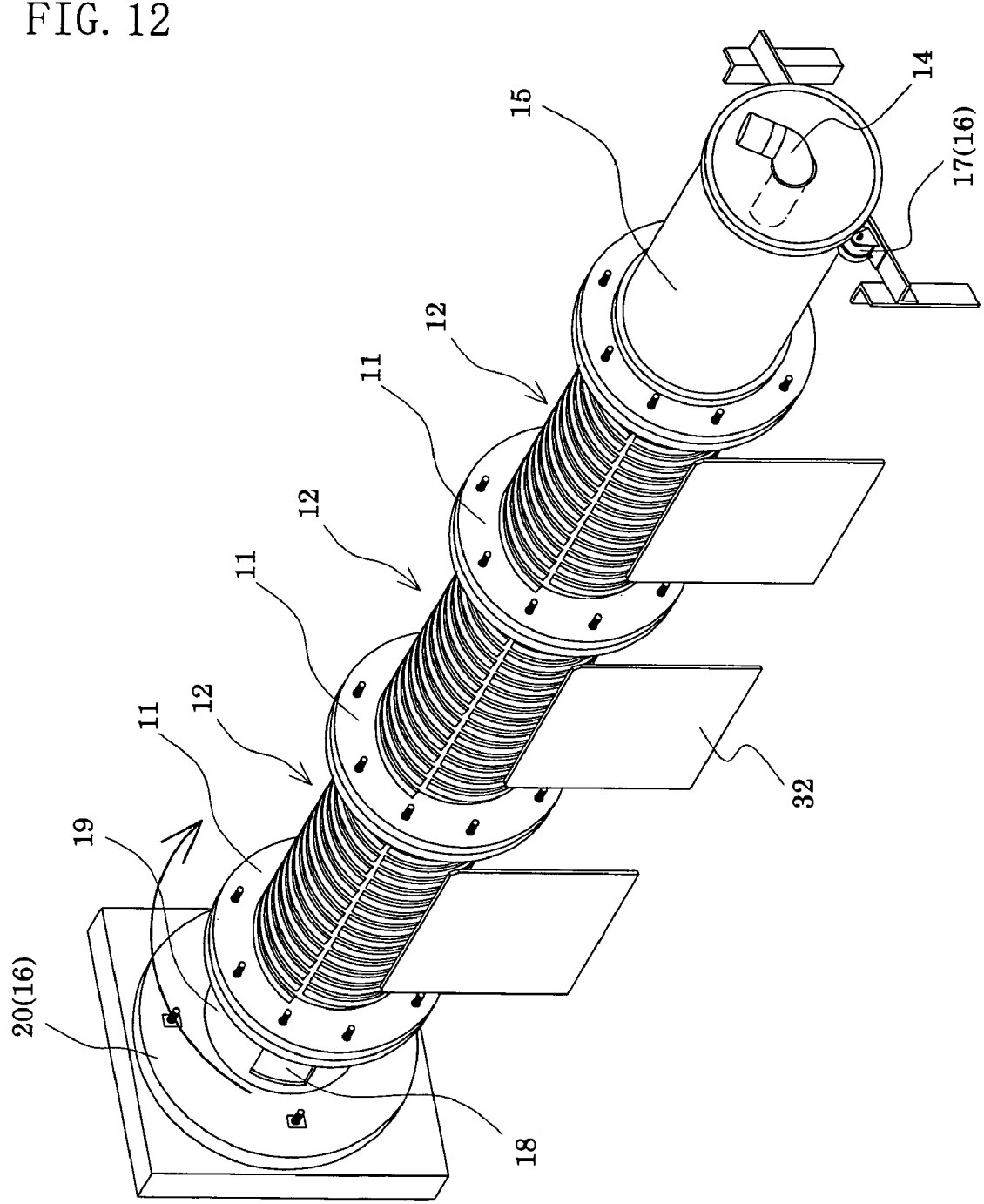
FIG. 12 is a perspective view showing another filtration apparatus according to one embodiment of the present invention.

In the present embodiment, two filtration units 11 are connected. However, no particular limitation is imposed on the number of filtration units. For example, as shown in FIG. 12, three filtration units 11 may be connected to one another, thereby further enhancing volume-reduced gel-state polystyrene resin filtration efficiency. In the present invention, a plurality of filtration units 11 are connected also for the purpose of ensuring the strength of the resultant filtration unit 11. However, needless to say, one single filtration unit having a prolonged length in the axial direction may also be employed. When such a long filtration unit 11 is employed, volume-reduced gel-state polystyrene resin can be filtered over a long period of time, and volume-reduced gel-state polystyrene resin having foreign matter adhering thereto can also be filtered completely.

Figure 13:
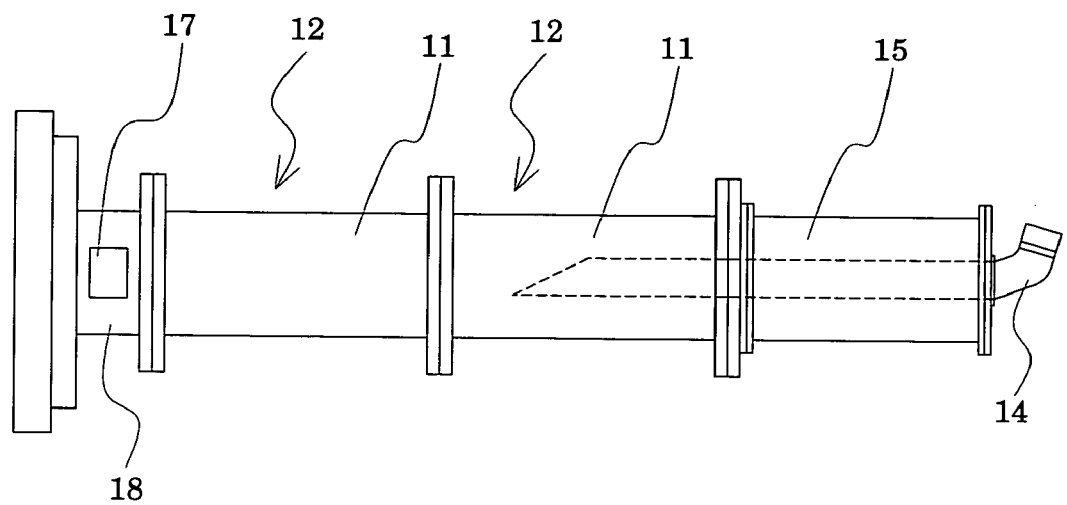
FIG. 13 is a side elevation of another embodiment of a feed pipe.
Figure 14:
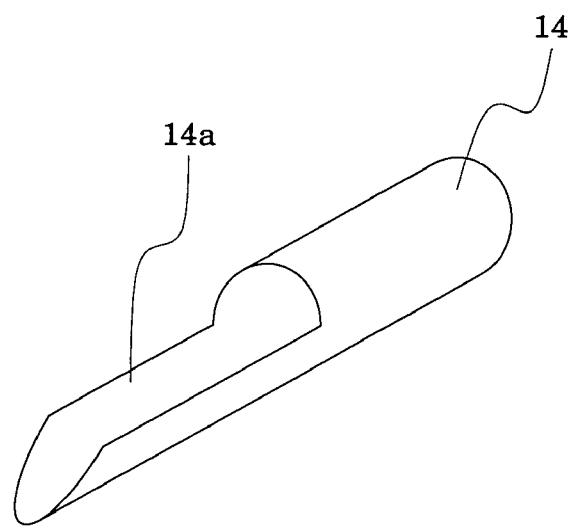
FIG. 14 is a perspective view of another embodiment of a feed pipe.

In the present embodiment, volume-reduced gel-state polystyrene resin is fed into the feed member 15 through the feed pipe 14. However, no particular limitation is imposed on the feeding method. For example, as shown in FIG. 13, the feed pipe 14 may be provided so as to extend to the inside of the filtration unit 11, thereby directly feeding volume-reduced gel-state polystyrene resin to the inside of the filtration unit 11 through the feed pipe 14. In this case, as shown in FIG. 14, at least a portion of the feed pipe 14 disposed in the filtration unit 11 may be provided with a trough 14a having an opening on the upper side thereof. Through employment of this structure, volume-reduced gel-state polystyrene resin is caused to spill over the trough 14a, whereby the resin can be supplied to a wide area of the filtration unit at a time, thereby remarkably enhancing filtration efficiency.

The gel deposition tank 50 in which the volume-reduced gel-state polystyrene resin that has been filtered is collected has a bottom surface 51 that is slanted toward one side. The volume-reduced gel-state polystyrene resin collected through the filtration units 11 of filtration sections 10 flows on the slanted bottom surface and is accumulated in a lower section of the gel deposition tank 50. The thus-accumulated volume-reduced gel-state polystyrene resin is fed to a separation/recovery unit (not illustrated) through, for example, a flow pipe 53 provided on the side wall of the gel deposition tank 50, by means of a feed pump 52.

In the separation/recovery apparatus, the volume-reduced gel-state polystyrene resin is heated to evaporate the solvent and recover the resin. The thus-recovered resin is molded into rod-like pieces, and the evaporated solvent is liquefied.

Figure 15:
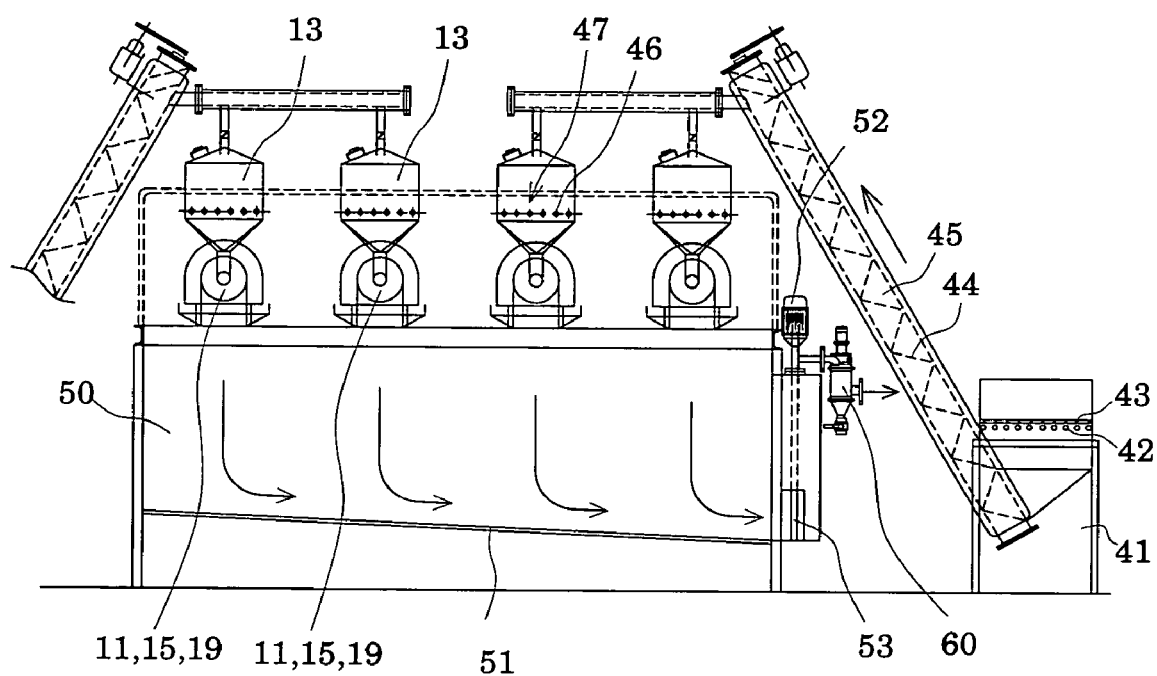
FIG. 15 is a schematic view showing a general configuration including filtration apparatuses according to another embodiment of the present invention.

In the present embodiment, the volume-reduced gel-state polystyrene resin which has been filtered in the filtration sections 10 is fed to the separation/recovery unit. However, the volume-reduced gel-state polystyrene resin which has been filtered in the filtration sections 10 may further be filtered. For example, as shown in FIG. 15, a second filtration apparatus 60 (having a mesh size of, e.g., about 50 to 200 mesh) finer than the filter portion 12 provided in each filtration section 10 may further be provided in a portion within the feed pipe 52.

In other words, in the aforementioned filtration apparatus of the present invention, volume-reduced gel-state polystyrene resin is filtered through the filter portion 12 having the slits 22 of specific form, and small pieces of foreign matter can also be removed. Thus, the volume-reduced gel-state polystyrene resin which has been filtered in the filtration sections 10 can further be filtered by means of the second filtration apparatus 60 having a fine filter.

Figure 16:
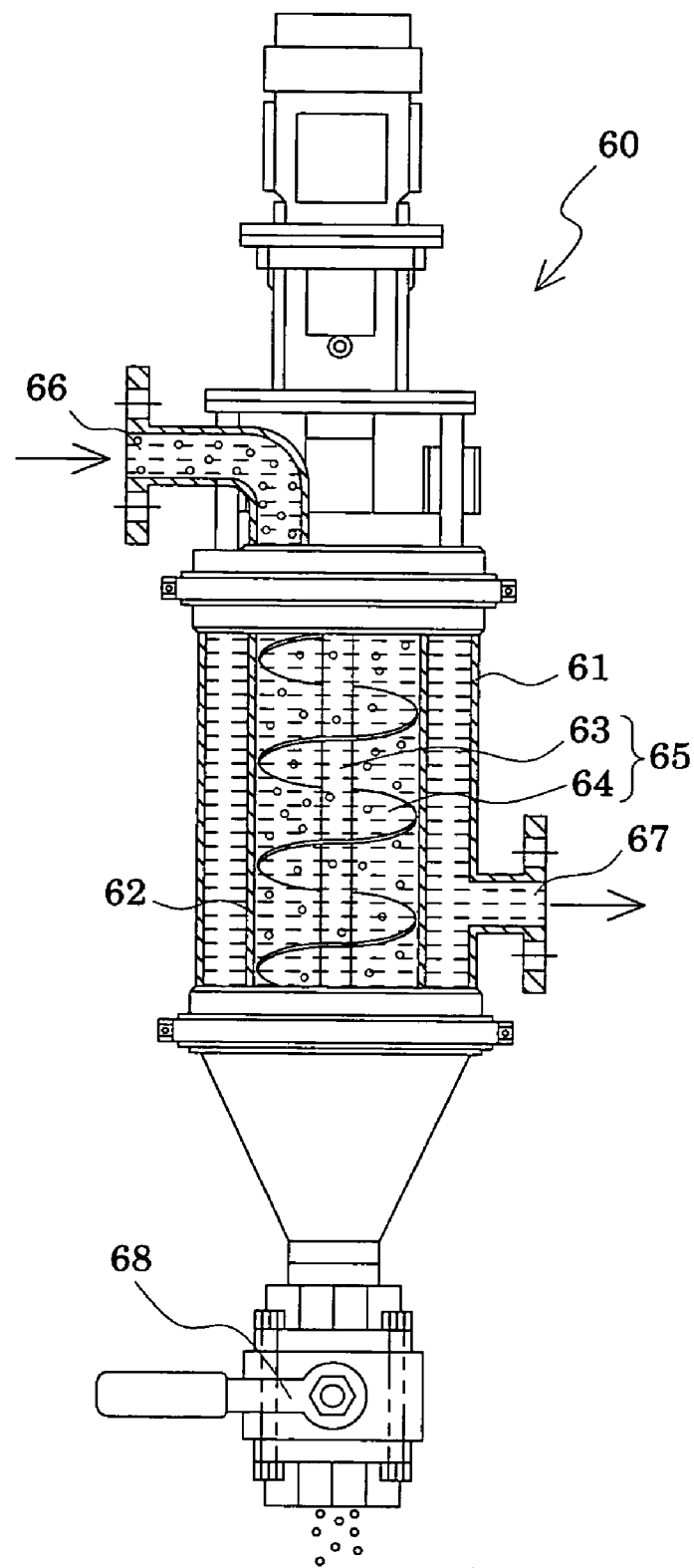
FIG. 16 is a schematic view showing a second filtration apparatus according to one embodiment of the present invention.

As shown in FIG. 16, the second filtration apparatus 60 has an apparatus main unit 61 and a hollow cylindrical microfilter 62 in the main unit. In the microfilter 62, a screw member 65 is rotatably supported, the screw member having a spirally provided screw plate 64 on a rotation axis 63, such that the screw member is in contact with the inner surface of the microfilter 62. The apparatus main unit 61 has, at the top thereof, a feed opening 66 for feeding volume-reduced gel-state polystyrene resin to the microfilter 62 and, at the bottom thereof, a discharge opening 67 through which the volume-reduced gel-state polystyrene resin that has filtered through the microfilter 62 is discharged.

The volume-reduced gel-state polystyrene resin is fed through the feed opening 66 to the microfilter 61 with pressure. When the screw member 65 is rotated, the resin is transferred toward the discharge opening 67. Through the procedure, the volume-reduced gel-state polystyrene resin is filtered through the microfilter 62, and the volume-reduced gel-state polystyrene resin which has been filtered is discharged through the discharge opening 67 and transferred to the separation/recovery unit (not illustrated). Foreign matter contained in the volume-reduced gel-state polystyrene resin is not discharged to the outside of the microfilter 62, and is transferred to the bottom of the apparatus main unit 62 by means of the screw plate 64 and accumulated in the main unit. When the screw member 65 is rotated and the tip of the screw plate 64 is brought into contact with the inner surface of the microfilter 62 with sliding, foreign matter adhering on the inner surface of the microfilter 62 is also scraped out and accumulated in the bottom of the apparatus main unit 62. The thus-accumulated foreign matter is discharged to the outside by opening a cock 68 provided at the bottom of the apparatus main unit 61.

As described above, the volume-reduced gel-state polystyrene resin which has been filtered in the filtration sections 10 is further filtered by means of the second filtration apparatus 60, whereby small pieces of foreign matter contained in the volume-reduced gel-state polystyrene resin can be removed almost completely. In addition, in the second filtration apparatus 60, foreign matter adhering on the inner surface of the microfilter 62 is scraped out by means of the screw plate 64 of the screw member 65, and a clean inner surface is maintained. Thus, volume-reduced gel-state polystyrene resin can be filtered effectively and continuously.

INDUSTRIAL APPLICABILITY

As described herein above, through employment of the filtration apparatus of the present invention, collected volume-reduced gel-state polystyrene resin can be continuously filtered, and foreign matter contained in the volume-reduced gel-state-polystyrene resin can be separately removed. Thus, operational efficiency can be remarkably enhanced, and cost can be remarkably reduced.

The invention claimed is:

1. A filtration apparatus for volume-reduced gel-state polystyrene resin, characterized in that the apparatus comprises
a filtration unit in the form of a hollow cylinder having an outer peripheral surface formed of a filter portion for filtering volume-reduced gel-state polystyrene resin;
a spiral plate provided on the inner surface of the filtration unit, projecting toward the inside of the filtration unit and spiraling in the axial direction of the filtration unit; and
a holding/driving portion for holding both axial ends of the filtration unit and for rotating the filtration unit about the axis thereof; wherein
the filtration unit is disposed so that the axial direction thereof is positioned generally horizontal, and the volume-reduced gel-state polystyrene resin is fed from the first end of the filtration unit to the inside thereof while the filtration unit is rotated by means of the holding/driving portion, whereby the volume-reduced gel-state polystyrene resin is continuously separated into volume-reduced gel-state polystyrene resin having passed through the filter portion and foreign matter contained in the volume-reduced gel-state polystyrene resin and transferred to the second end of the filtration unit by means of the spiral plate,
wherein the filter portion has slits provided in the circumferential direction of the filtration unit in the form of a hollow cylinder, each slit being defined by opposing walls, and
wherein the slits are spirally provided.

2. A filtration apparatus for volume-reduced gel-state polystyrene resin according to claim 1, wherein the opposing walls defining each slit have different heights, as viewed in the cross-section of the filtration unit in the axial direction of the unit, whereby an inner surface of the filter portion protruded/dented in the axial direction is provided.

3. A filtration apparatus for volume-reduced gel-state polystyrene resin according to claim 1, wherein a protrusion is provided on a portion of the inner surface of the filtration unit in the axial direction of the unit.

4. A filtration apparatus for volume-reduced gel-state polystyrene resin according to claim 1, wherein each slit has an inner space and an outer space, the inner space being provided in an inner portion of the filter portion and extending in the radial direction of the filter portion; the outer space being provided in an outer portion of the filter portion and extending in the radial direction of the filter portion; and the inner space and outer space are connected with a connecting portion having a width less than the width of the inner space.

5. A filtration apparatus for volume-reduced gel-state polystyrene resin according to claim 4, wherein the filter portion is formed of a first filter having a first through-hole, and a second filter having a second through-hole; the first through-hole being provided so as to penetrate the first filter in the thickness direction and serve as the inner space; the second through-hole being provided so as to penetrate the second filter in the thickness direction and serve as the outer space; the first filter and the second filter being provided such that they are disposed with a predetermined distance therebetween in radial direction and that the first through-hole and the second through-hole do not coincide with each other in the axial direction, to thereby form the slits.

6. A filtration apparatus for volume-reduced gel-state polystyrene resin according to claim 5, wherein the second filter is formed of a plurality of comb-teeth-shape members disposed in the circumferential direction of the filtration unit; the frontal end of each comb-teeth-shape member with respect to the rotational direction of the filtration unit is secured to the outer peripheral surface of the first filter; the other end serves as a free end; and this other end and the first filter are disposed at predetermined spacing.

7. A filtration apparatus for volume-reduced gel-state polystyrene resin according to claim 1, wherein the volume-reduced gel-state polystyrene resin which has been filtered by means of the filter portion provided in the filtration unit is fed to a second filtration apparatus for filtering the volume-reduced gel-state polystyrene resin; the second filtration apparatus includes a microfilter in the form of a hollow cylinder finer than the filter portion provided in the filtration unit; and the volume-reduced gel-state polystyrene resin which has been fed under pressure to the inside the microfilter is extruded to the outside.

8. A filtration apparatus for volume-reduced gel-state polystyrene resin according to claim 7, wherein the second filtration apparatus comprises the microfilter and a screw member that is fitted in the microfilter, and a tip of the screw member is brought into slidable contact with the inner surface of the microfilter, thereby scraping out foreign matter adhering on the inner surface of the microfilter.

9. A filtration apparatus for volume-reduced gel-state polystyrene resin according to claim 1, which further comprises a scraper which is provided so as to abut, at the tip thereof, the outer peripheral surface of the filter portion for scraping out the volume-reduced gel-state polystyrene resin discharged to the outside through filtration by means of the filter portion.

10. A filtration apparatus for volume-reduced gel-state polystyrene resin according to claim 1, which further comprises a feed pipe for feeding volume-reduced gel-state polystyrene resin, the feed pipe extending from the outside of the filtration unit to the inside of the filtration unit.

11. A filtration apparatus for volume-reduced gel-state polystyrene resin according to claim 10, wherein at least a portion of the feed pipe provided inside the filtration unit is formed of a trough having an opening on the upper side thereof.

12. A filtration apparatus for volume-reduced gel-state polystyrene resin according to claim 1, wherein the filtration unit is held by the holding/driving portion in a slanted state such that the first end of the filtration unit is located on the upper side.

13. A filtration apparatus for volume-reduced gel-state polystyrene resin according to claim 1, which further comprises heating means for heating the filtration unit, which heating means covers the outer peripheral surface of the filtration unit and is not in contact with the filtration unit.

14. A filtration apparatus for volume-reduced gel-state polystyrene resin according to claim 13, wherein the filtration unit is heated by the heating means in which warm water is circulated.

15. A filtration apparatus for volume-reduced gel-state polystyrene resin for claim 1, wherein volume-reduced gel-state polystyrene resin is heated to a predetermined temperature and is caused to pass through an ultrasonic filter to which ultrasonic vibration is applied so as to fluidize the resin, and the fluidized resin is introduced into the filtration unit.

* * * * *